US005415821A

United States Patent [19]

Irie et al.

[11] Patent Number: 5,415,821

[45] Date of Patent: May 16, 1995

[54] METHOD OF MANUFACTURING FIBER REINFORCED INORGANIC HARDENED BODY

[75] Inventors: Shoichiro Irie; Motonobu Abe; Norihito Akiyama, all of Yokohama, Japan

[73] Assignees: Ask Corporation; Sanshin Thermal Insulation Co., Ltd., both of Yokohama, Japan

[21] Appl. No.: 133,850

[22] Filed: Oct. 12, 1993

Related U.S. Application Data

[62] Division of Ser. No. 990,521, Dec. 15, 1992.

[30] Foreign Application Priority Data

Jul. 3, 1992 [JP] Japan ............ 4-176828

[51] Int. Cl.$^6$ ............ B32B 13/02

[52] U.S. Cl. ............ 264/113; 264/112; 156/62.2

[58] Field of Search ............ 264/112, 113, 115, 116; 156/62.2

[56] References Cited

U.S. PATENT DOCUMENTS

| | | | |
|---|---|---|---|
| 2,744,045 | 5/1956 | Collins | 264/116 |
| 2,979,105 | 4/1961 | Burkner | 264/112 |
| 4,402,890 | 9/1983 | Offenhausen et al. | 264/113 |
| 4,496,636 | 1/1985 | Exner | 264/113 |
| 4,971,540 | 11/1990 | Barnes | 264/113 |
| 5,102,596 | 4/1992 | Lempfer et al. | 264/115 |
| 5,171,498 | 12/1992 | Powell | 264/113 |

FOREIGN PATENT DOCUMENTS

| | | | |
|---|---|---|---|
| 277041 | 3/1990 | Germany | 264/112 |
| 867219 | 5/1961 | United Kingdom | 264/113 |

*Primary Examiner*—Allan R. Kuhns

*Attorney, Agent, or Firm*—Oblon, Spivak, McClelland, Maier & Neustadt

[57] ABSTRACT

A fiber reinforced inorganic hardened body is manufactured from raw material including of a mixture of reinforcing fiber such as bamboo fiber, water-hardening inorganic binder and water by a manufacturing apparatus for stirring and mixing such raw material and forming it into a mat configuration laminated with the thin layers of fine fibers on the both front and rear sides of the thick layer of the normal raw material. The fine fiber material adhered with the water-hardening binder is partially separated from the main raw material at both the material supply side and material discharge side of a pin-type roll set. The portion of the fine fiber separated from the main raw material is first supplied to the upstream side of of the forming conveyor to form a first layer of fine fiber. The remaining raw material is supplied onto this first layer of fine fiber on the forming conveyor to form a second layer of main raw material, and the other part of the fine fiber separated from the raw material at the material supply side is dropped onto the second main layer of the raw material to form a third layer of fine fiber, to thereby form a mat of raw material of the first and third layers of fine fiber and of a second layer of the main raw material therebetween. The laminated three layers of the mat are then compressed and cured to form a fiber reinforced inorganic hardened body.

1 Claim, 3 Drawing Sheets

METHOD OF MANUFACTURING FIBER REINFORCED INORGANIC HARDENED BODY

This is a division of U.S. application Ser. No. 07/990,521, filed on Dec. 15, 1992, now pending.

BACKGROUND OF THE INVENTION

This invention relates to a method of manufacturing a fiber reinforced inorganic hardened body, more particularly to a method and apparatus for manufacturing a fiber reinforced inorganic hardened body such as a cement board reinforced by such as bamboo fiber.

Conventionally, the manufacture of various kinds of fiber reinforced inorganic hardened bodies such as cement boards strengthened with ligneous reinforcing material for example ligneous flake or lignocellulose and formed with an inorganic binder such as cement has been widely known.

However, although variety of cement boards using ligneous reinforcement have been made heretofore and satisfactory techniques therefore have been established, no technique for manufacturing sufficiently appropriate cement board reinforced by bamboo fiber has been established because no technique for effectively utilizing the bamboo fiber for cement board using bamboo fiber has been established yet.

Therefore, the object of the invention is to provide a method of manufacturing a fiber reinforced inorganic hardened body such as a cement board that is economical and easily and simply reinforced by effectively using bamboo fiber in order to solve the above-mentioned problems in the prior arts.

SUMMARY OF THE INVENTION

To achieve the above object, in accordance with the present invention, there is provided a method of manufacturing a fiber reinforced inorganic hardened body comprising the steps of:

- supplying the raw material consisting of a mixture of reinforcing fiber, water-hardening inorganic binder and water into a first stage of pin-type roll sets of a manufacturing apparatus for stirring and mixing the raw material;
- first separating a part of fine fiber in the reinforcing fiber of the raw material at the material supply side of a second stage of the roll sets:
- supplying the raw material into the second stage of the roll sets for averaging the raw material;
- again separating another part of the fine fiber in the reinforcing fiber of the raw material at the material discharge side of the second stage of the roll sets;
- supplying the lastly separated fine fiber to an upstream side of a movable forming conveyor and simultaneously supplying the remaining raw material through a third stage of the roll sets to average the raw material and then to a forming conveyor for forming a mat;
- supplying the first separated fine fiber onto the mat;
- pressurizing the raw material to form a mat thereof; and
- curing and hardening said formed mat thereafter.

The above-mentioned method of the present invention is carried out by an apparatus for manufacturing a fiber reinforced inorganic hardened body in which the apparatus comprises a plurality of sets of pin-type rolls which are disposed in three stages, a first set of pin-type rolls being disposed on an upper stage having a first raw material supply means for uniformly supplying the raw material along the width of the pin-type rolls; a second set of pin-type rolls disposed so that the raw material which has passed through the lower side of the upper first set of pin-type rolls is supplied directly thereon; a separating means provided below the second set of pin-type rolls to separate short fine fibers separated from the raw material which mainly comprises fine fiber which has fallen through the second set of pin-type rolls to be used for forming an upper layer of fine fiber; a second raw material supply means for supplying the raw material which has passed through the upper side of the second set of pin-type rolls onto a third set of pin-type rolls provided at the opposite side of and in a lower position than the second set of pin-type rolls; a second separating means provided below the third set of pin-type rolls to further separate the short fine fiber separated from the raw material comprised mainly of the fine fiber which has fallen through the third set of pin-type rolls for forming a lower layer of fine fiber; and a movable flat-shaped forming conveyor for receiving the raw material to be formed into a mat-form.

With the above mentioned constitution of the method of the present invention, the raw material consisting of the mixture of reinforcing fiber, water-hardening inorganic binder and water is supplied onto the movable flat-shaped forming conveyor for forming the raw material into the mat-form while a fine part of the reinforcing fiber adhered with the water-hardening binder in the raw material is separated respectively at the material supply side and the material discharge side of the second stage of the roll sets through a plurality of pin-type roll sets arranged in a plurality of stages, appropriately three stages for example during the supply of the raw material onto a movable plane forming conveyor, these separated fine fibers then being supplied respectively to the upstream side and the downstream side of the raw material dropped onto the forming conveyor to form layers of the fine fiber material laminated on and beneath the main raw material, so that a laminated mat with good appearance can be formed.

BRIEF DESCRIPTION OF DRAWINGS

For illustrative purposes only, an embodiment of a manufacturing apparatus for carrying out the method of manufacturing a fiber reinforced inorganic hardened body of the present invention will be described with reference to the accompanying drawings of which.

DESCRIPTION OF THE PREFERRED EMBODIMENT OF THE INVENTION

In accordance with the present invention, a method of manufacturing a fiber reinforced inorganic hardened body consists of supplying the raw material consisting of a mixture of reinforcing fiber, water-hardening inorganic binder and water into a first stage of pin-type roll sets of a manufacturing apparatus for stirring and further mixing the raw material, first separating a part of the fine fiber adhered with the water-hardening binder in the reinforcing fiber of the raw material at the material supply side of the second stage of the roll sets, supplying the raw material into the second stage of the roll sets for leveling the raw material, again separating another part of the fine fiber adhered with the water-hardening binder in the reinforcing fiber of the raw material at the material discharge side of the second stage of the roll sets, supplying this secondly separated fine fiber to an upstream side of a movable forming conveyor and simultaneously supplying the remaining raw material through the third stage of the roll sets for leveling, stirring and mixing the raw material and supplying the raw material onto the forming conveyor to form a mat, supplying the first separated fine fiber onto the mat, pressurizing the raw material into a final mat form thereof, and curing and hardening said formed mat thereafter.

Figure 1:
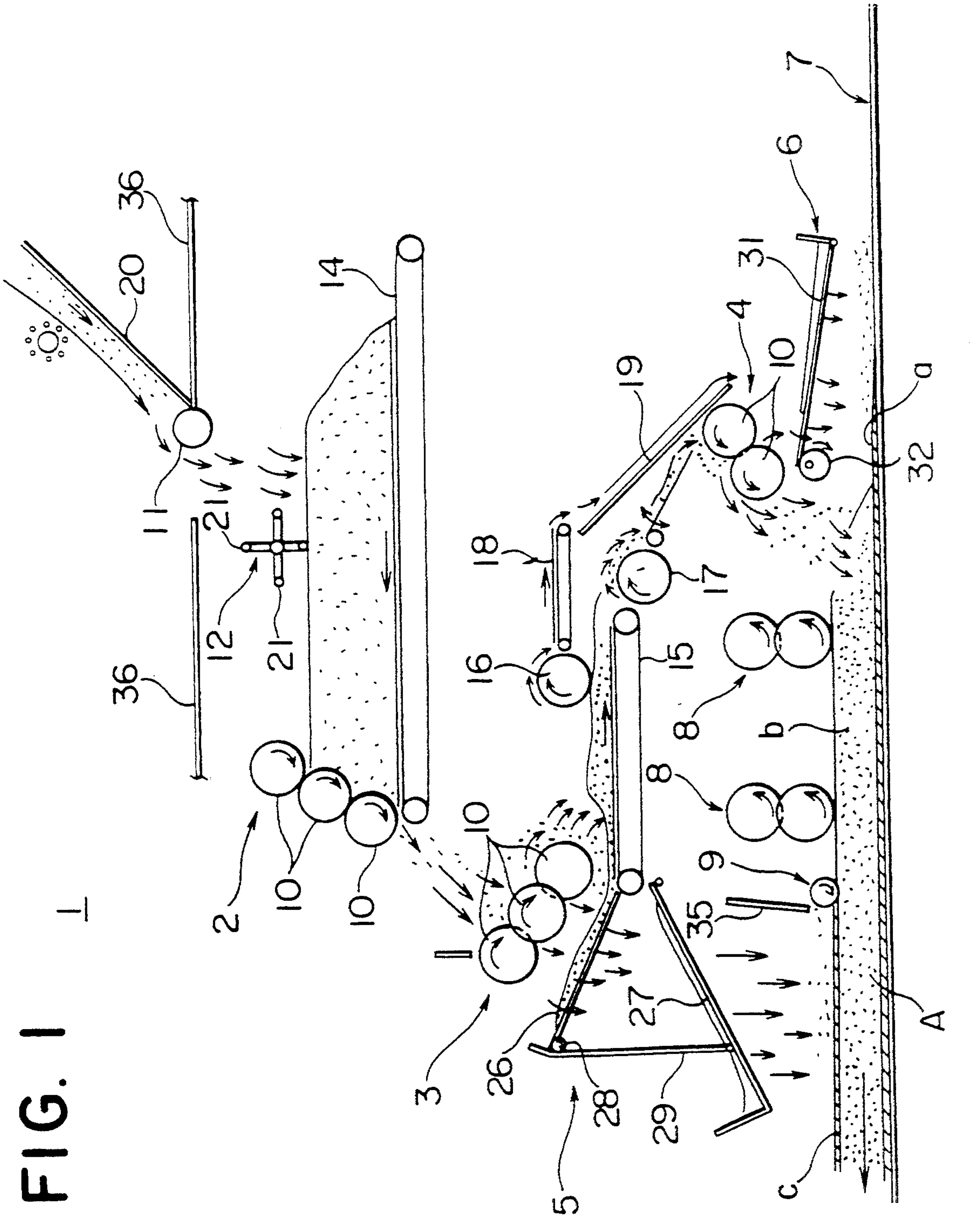
FIG. 1 is a schematic elevation view of a manufacturing apparatus of this invention.

In FIG. 1, an embodiment of a manufacturing apparatus for carrying out the above method of manufacturing a fiber reinforced inorganic hardened body of the present invention is shown.

As shown in FIG. 1, a manufacturing apparatus 1 for a fiber reinforced inorganic hardened body consists mainly of a plurality of sets 2, 3 and 4 of pin-type rolls 10 disposed in a plurality of stages (for example three stages in the embodiment shown), a first separating means 5 for separating a part of the fine fiber in the reinforcing fiber provided at the material supply side of set 3 of pin-type rolls in the second stage, a second separating means 6 for further separating another part of the fine fiber in the reinforcing fiber provided at the material discharge side of the set 3 of the pin-type rolls in the second stage, a movable forming conveyor 7 carrying steel plates or flat plates for receiving the raw material consisting of a mixture of reinforcing fiber, water-hardening inorganic binder and water to be formed into a mat-form, and a finishing roll 8 and a compressing roll 9 for forming the raw material supplied onto the forming conveyor into the final mat-form.

In addition to the three stages of pin-type roll sets 2, 3 and 4, the separating means 5 and 6, the forming conveyor 7, the finishing roll 8 and the compression roll 9 as shown, the manufacturing apparatus device 1 for the fiber reinforced inorganic hardened body of the present invention shown further consists of a material supply roll 11 for supplying the raw material consisting of the mixture of the reinforcing fiber, the water-hardening inorganic binder and water, a rotary brush 12, a first raw material supply conveyor 14, a second raw material supply conveyor 15, a raw material adjusting roll 16 and a raw material supply roll 17, and all of these members are included within a housing 36.

First, the raw material to be used in the present invention consists of of a mixture of 70 parts by weight of cement, 30 parts by weight of the reinforcing fiber such as bamboo fiber and 25 to 30 parts by weight of water in a semi-dry condition with the fiber coated with cement, there is not enough water included to flow out, and the raw material is finally hardened to form a favorable fiber reinforced inorganic hardened body by the compression and forming. Such raw material is first supplied from above the housing 36 through an oscillation plate 20 to the material supply roll 11 disposed on the housing 36 by the oscillation of the plate 20, and then the raw material from this material supply roll 11 is supplied to the first raw material supply conveyor 14. The raw material supplied on the first raw material supply conveyor 14 is then leveled by the rotary brush 12 and is transported toward the set 2 of the pin-type rolls in the first stage at the raw material discharge side of the first raw material supply conveyor 14. The pin-type rolls of set 2 in this first stage act as a roll for mixing and stirring the raw material.

Figure 2:
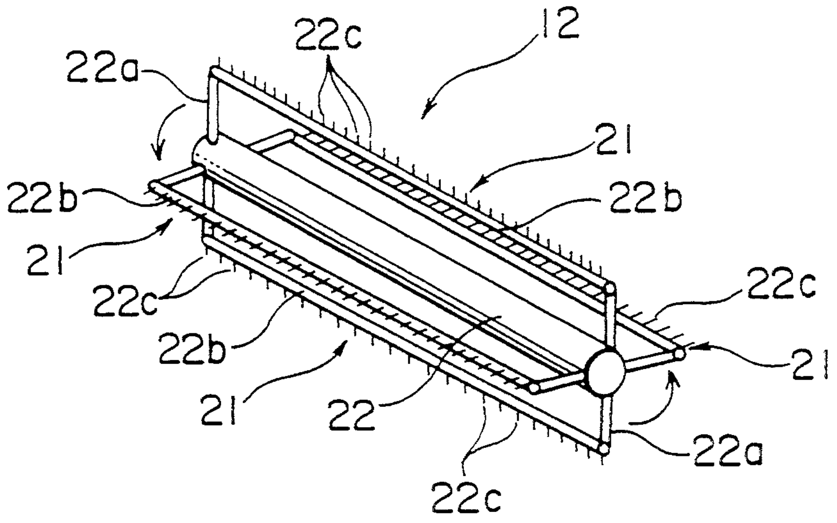
FIG. 2 is a perspective view of a rotary brush.

As shown in FIG. 2, the rotary brush 12 is constructed from a plurality of planetary brushes 21 which are formed with a number of outwardly protruding pins 22c implanted on each planetary shaft 22b spaced a fixed distance from a rotary shaft 22 in parallel by a pair of cross-shaped arms 22a. The ends of the brushes 21 are secured on the rotary shaft 22 by the arms 22a.

Figure 3:
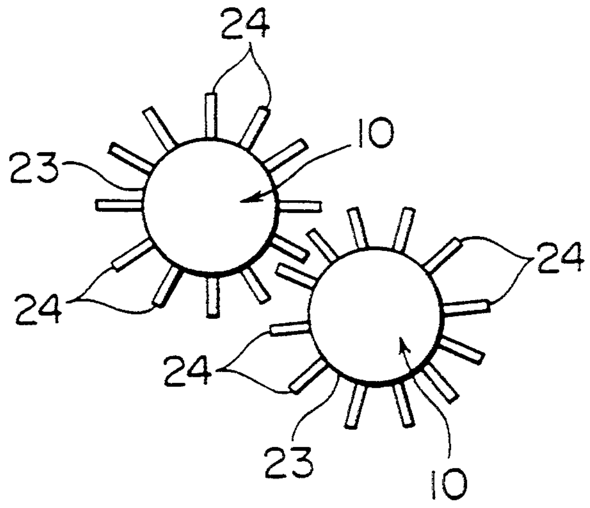
FIG. 3 is a schematic side view of a pin-type roll.
Figure 4:
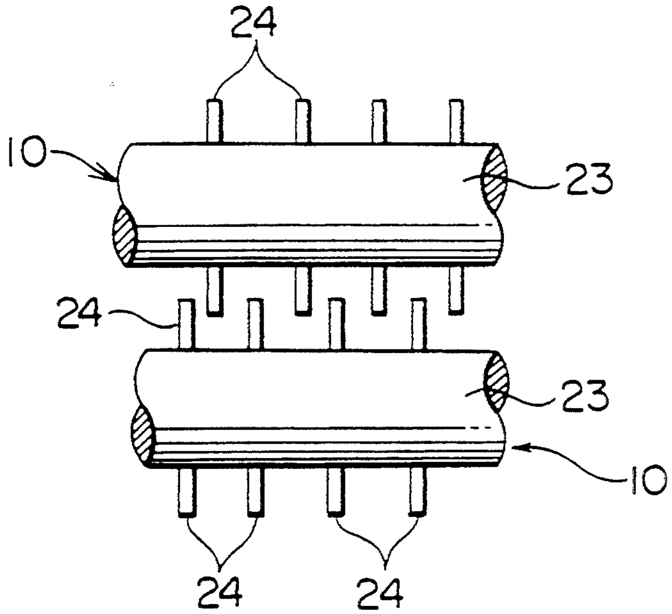
FIG. 4 is a partial elevation view of the roll shown in FIG. 3.

The set 2 of the pin-type rolls in the first stage is formed from a plurality of pin-type rolls each of which is used as raw material scraping off roll constructed with many numbers of pins 24 implanted on the periphery of a roll 23 as shown in FIGS. 3 and 4, and the set 2 is constructed from three pin-type rolls in which the pins 24 of each roll are engaged with each other as shown in the drawings. Further, the set 3 of the pin-type rolls in the second stage and the set 4 of the pin-type rolls in the third stage are similar to the pin-type rolls 10 of set 2 with the basic construction of these pin-type rolls being the same. The details of construction such as thickness, spacing, implant angle, and shape of the pins 24, or the thickness and number of the rolls 23 may be freely determined in accordance to need respectively, and in practice there may be some slight differences. In particular, for the set 2 of the pin-type rolls in the first stage the length of the pins 24 are preferably not so long so that the engagement of the pins of adjacent pin-type rolls can be greatly reduced and the pins 24 are tilted slightly towards the roll 23 upon the implanting thereof to improve the operations for mixing, stirring and conveying the raw material. Also, for the set 2 of the pin-type rolls in the first stage the adjustments of the conveyer speed and the rotation of the rolls and the tilting angle of the rolls are appropriately adjusted and determined in order to improve the operation for mixing, stirring and conveying the raw material. Furthermore, pins of cylindrical-rod shape, strip shape or other appropriate shapes may be used. It is to be noted that the set 3 of the pin-type rolls in the second stage operate as rolls for leveling the raw material and the set 4 of the pin-type rolls in the third set operate as forming rolls. The number of rolls in the sets to be used in the first, second and third stages are not limited to two or three as shown in the drawings and any number thereof can be used.

The pins 24 of each of the rolls 23 for the set 2 of the pin-type rolls in the first stage as material scraping rolls do not engage at all or are only engaged slightly at their ends and they thus can operate to stir, mix and supply sufficient raw material by adjusting the conveyor speed of the first raw material supply conveyor 14. Therefore, the raw material scraped by the set 2 of the pin-type rolls in the first stage is supplied to the following set 3 of pin-type rolls in the second stage operating as raw material leveling rolls.

Such pins 24 of the rolls 23 for the set 3 of the pin-type rolls in the second stage have the sufficient length and can be completely engaged with the pins 24 of adjacent rolls 23 to satisfactorily stir and mix the raw material. The raw material supplied from the set 2 of the pin-type rolls in the first stage is leveled by the plurality of successively arranged pin-type rolls 10 in the set 3 of the pin-type rolls and is then supplied to the second raw material supply conveyor 15. At that time, a part of the raw material falls downwardly between adjacent pins 24 of the plural successive pin-type rolls 10 in set 3 of the pin-type rolls. The raw material falling downwardly from the set 3 of the pin-type rolls in the second stage falls on the first separating means 5 including an oscillating upper screen 26 and a lower screen or meshes 27, so that the raw material fallen on the separating means can be separated into fine or small reinforcing fibers adhered with the water-hardening binder by the oscillation of the separating means 5 including the screens or meshes 26 and 27 by use of a cam 28 and a rod 29. The separated fine reinforcing fiber is then dropped on the raw material layered on the lowest moving steel plates or flat plates ridden on the forming conveyor 7 and is finally formed into an upper layer, that is, a third fine fiber layer (c).

The raw material conveyed by the second raw material supply conveyor 15 is partially divided by a raw material adjusting roll 16 which is comprised from a roll similar to the pin-type roll 10 and part is transported through another conveyor 18 and a chute 19 to a second separating means 6 including a second screen or mesh 31 and a cam 32, where it is separated into very fine or fine reinforcing fiber material adhered with the water-hardening binder by the oscillation of the second separating means 6. For this second separating means 6, the very fine fiber portion is first dropped on the moving steel plate or flat plate laid on the forming conveyor 7 to be followed by the fine fiber portion, and these form into a thin, first lower layer (a).

On the other hand, the other part of the raw material is leveled, stirred and mixed into an adjusted condition on the second raw material supply conveyor 15 by the raw material adjusting roll 16, transported by the second raw material supply conveyor 15, and is supplied into the set 4 of the successively disposed plural pin-type rolls in the third stage comprising the forming rolls by the rotation of a raw material supply roll 17 consisting of a roll similar to the pin-type roll 10 provided at the raw material discharge side of the second raw material supply conveyor 15. The raw material supplied to the set 4 of the pin-type rolls is further leveled, stirred and mixed by the successively disposed plural pin-type rolls 10, and is dropped and supplied irregularly on the first layer (a) of the very fine and fine fiber portions supplied previously through the second separating means 6 onto the steel plates or flat plates laid on the forming conveyor 7 moving from right to left in FIG. 1.

This first layer (a) of the reinforcing fiber consists of the very fine and fine fiber portions separated by the second separating means 6 from the reinforcing fibers is part reinforcing fiber that has fallen from the raw material supplied to the set 4 of plural pin-type rolls 10 in the third stage between the pins 24 of the adjoining pin-type rolls 10, and part which is divided by the raw material adjusting roll 16 from the raw material moving with the second supply conveyor 15 and supplied through the conveyor 18 and the chute 19 to the separating means 6. With the separating means 6 the reinforcing fibers are separated into very fine and fine fiber portions and then supplied to the moving steel plates or flat plates riding on the forming conveyor 7 to form the first layer (a) of very fine and fine reinforcing fibers formed as a lower layer on the forming conveyor 7.

Figure 5:
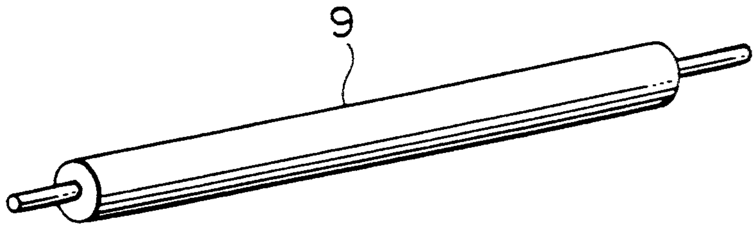
FIG. 5 is a schematic view of a compression roll.

Then, the raw material mainly consisting of the normal reinforcing fiber is supplied from the set 4 of the pin-type rolls in the third stage onto the first layer (a) of the very fine and fine reinforcing fibers laminated on the forming conveyor 7 to build up a second thick layer (b) of the main raw material. The laminated layers of the first layer (a) of the fine fiber and the second thick layer (b) of the normal raw material is leveled into a flat condition by a set of finishing rolls 8 consisting of rolls similar to a pair of pin-type rolls 10, is laminated with a third layer (c) of the fine fiber thereon and is compressed to the desired compression by the compression roller 9 clearly shown in FIG. 5 to form a mat of laminated layers. A plurality of sets of such finishing rolls 8 can be provided. The supply position of the fine fiber for laminating the third layer (c) can be selected to be any where on the left side of the finishing rolls 8 provided at the very right in FIG. 1.

By the above mentioned steps, a raw material mat A of three layered-form can be formed by which the first layer (a) consisting of the very fine and fine fibers as a lower first layer is provided firstly, the second layer (b) consisting of the normal fiber of the raw material as an intermediate layer is next laminated on the first layer and the third layer (c) consisting of the very fine and fine fibers as an upper layer is finally laminated on the first and second layers. The remaining raw material in the separating means 5 and 6 can be returned together with the original raw material to the raw material mixing apparatus.

Thereby, the raw material mats A laminated and formed into the desired size on the steel sheets riding on the forming conveyor 7 are further laminated into a plurality of laminations into the necessary forms together with the steel sheets, compressed by the desired pressure and cured to form the final products. The raw material only includes the moisture needed for forming and although the binder particles attached to the surface of the bamboo fibers by the water in the mixture are wetted with moisture, there is not enough water included to flow out. Therefore, enough moisture is included in this condition to cure the raw material itself therein and the formed mats can be cured perfectly to make them sufficiently hardened in the curing step. It is also advantageous to provide a partition 35 for the fine fiber of the third layer above the compression roll 9 and a housing 36 for covering the whole apparatus substantially.

By the method and apparatus for manufacturing the fiber reinforced inorganic hardened body in accordance with the present invention, a desired fiber reinforced inorganic hardened body of three layered construction with excellent appearance and physical properties can be made in which the fine fiber portion is separated from the portion of the raw material consisting of the mixture of reinforcing fibers such as bamboo fibers, water-hardening inorganic binder and water, and is formed with the fine fiber layers laminated on the upper and lower sides of the raw material mat formed into a mat configuration for forming the lamination layers of the fine fibers with the separated fine fiber by the separating means provided on the raw material supply side and the raw material discharge side of the set of pin-type rolls in the second stage arranged appropriately in plural, desirably three stages.

What is claimed:

1. A method of manufacturing a fiber reinforced inorganic hardened body, the method comprising the steps of:

supplying a raw material comprising a mixture of reinforcing fiber, water-hardening inorganic binder and water into a first stage of pin-type roll sets of a manufacturing machine and stirring and mixing the raw material;

separating first a portion of fine fiber in the reinforcing fiber of the raw material at a material supplying side of a second stage of the pin-type roll sets;

supplying the raw material into the second stage of the pin-type roll sets and leveling the raw material;

separating further another portion of fine fiber in the reinforcing fiber of the raw material at a material discharge side of the second stage of the pin-type roll sets;

supplying the further separated fine fiber to an upstream side of a movable forming conveyor and simultaneously supplying the remaining raw material through a third stage of the pin-type roll sets and leveling, stirring and mixing the raw material, and supplying the raw material to the forming conveyor and forming a mat of a three layer construction, the mat including top and bottom layers of fine fibers and a middle layer of mixed fine and long fibers;

supplying the initially separated fine fiber into the mat;

pressurizing the raw material to form the mat thereof; and curing and hardening said formed mat thereafter.

* * * * *